Sept. 3, 1946.  W. F. SCHMIED  2,407,104
MANURE SPREADER HAVING ADJUSTABLE FEED MECHANISM
Filed Dec. 23, 1943  2 Sheets-Sheet 1

Inventor:
William F. Schmied,
By Paul O. Pippel
Attorney

Sept. 3, 1946.   W. F. SCHMIED   2,407,104
MANURE SPREADER HAVING ADJUSTABLE FEED MECHANISM
Filed Dec. 23, 1943   2 Sheets-Sheet 2
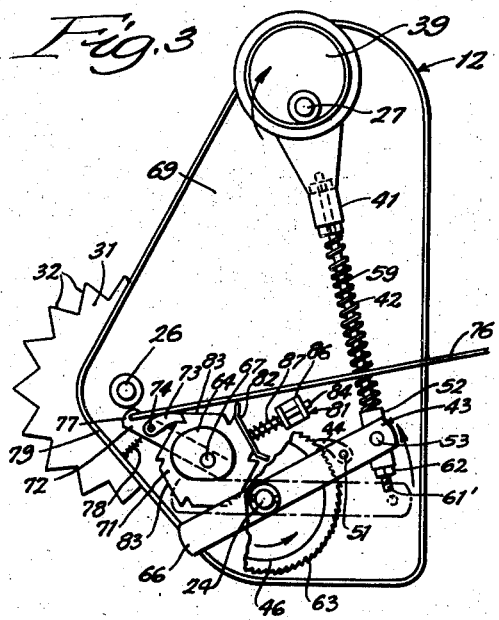
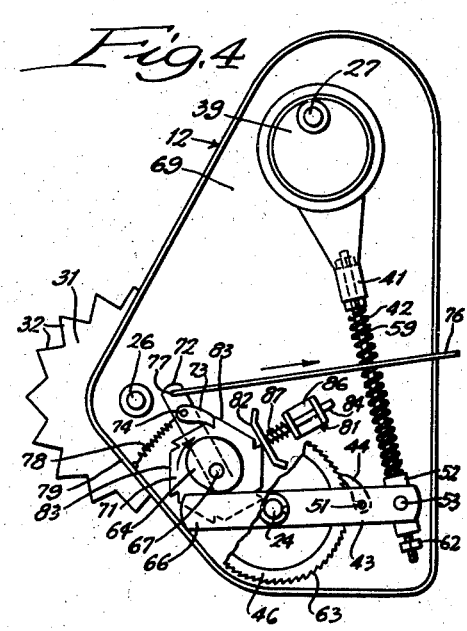
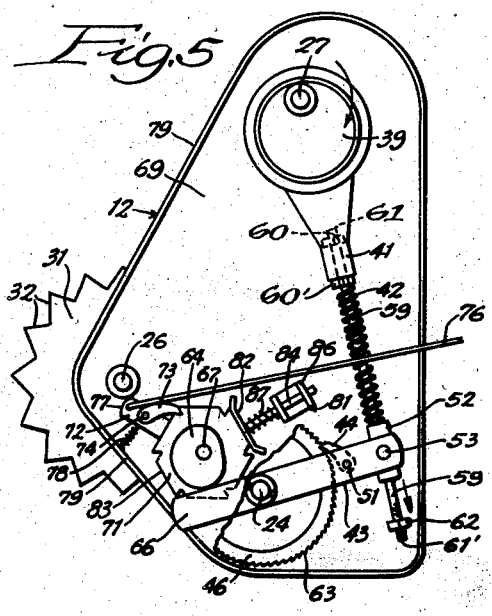
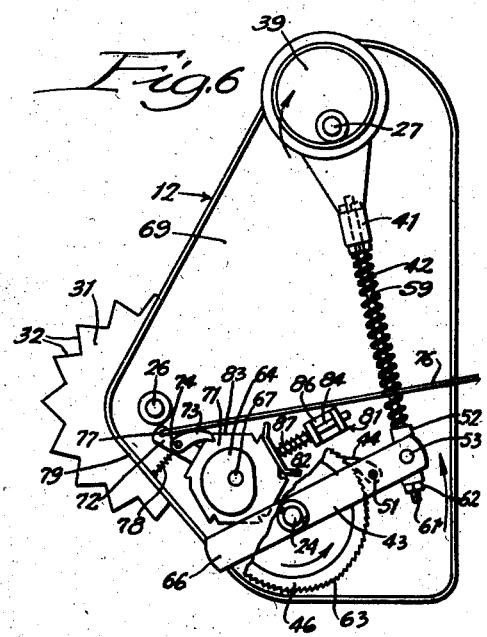
Inventor:
William F. Schmied,
By Paul O. Pippel
Attorney.

Patented Sept. 3, 1946

2,407,104

UNITED STATES PATENT OFFICE 2,407,104

MANURE SPREADER HAVING ADJUSTABLE FEED MECHANISM

William F. Schmied, Blue Island, Ill., assignor to International Harvester Company, a corporation of New Jersey Application December 23, 1943, Serial No. 515,338

10 Claims. (Cl. 74—116)

This invention relates to a new and improved manure spreader having an adjustable feed mechanism and has for one of its principal objects the provision of means for varying the amount of manure to be spread.

An important object of the invention is to provide a feed adjusting mechanism that will permit increasing or decreasing the quantity of manure to be spread and to alternate such increases or decreases upon successive movements of an operating lever through the same movement.

Manure spreaders are ordinarily equipped with a wagon portion having a slatted chain operating in the bottom of the wagon and acting to carry manure in the wagon to a spreading unit fastened to the back end of the wagon. The drive for this conveyor chain may be driven by means of a power take-off from the draft tractor or may be driven from a ground wheel of the manure spreader wagon. Regardless of how the slatted conveyor chain is driven, it is desirable to be able to vary the speed of this chain so as to spread the manure in greater or lesser quantities as the particular field may require. It is, therefore, an important object of the present invention to provide a means for adjusting the speed of the slatted conveyor chain with a novel mechanism interposed between a ground wheel drive and the chain drive.

A particular object of the present invention is to provide a cam means optionally operable through small increments to effect a variable speed for a manure spreader feed chain.

Other and further important objects will become apparent from the disclosures in the following specification and accompanying sheets of drawings, in which:

Figure 3 is a detail view of the spreader unit similar to that shown in Figure 1 and particularly showing the mechanism for varying the manure spreader chain feed;

Figure 4 is similar to Figure 3 and shows the change-speed mechanism in an intermediate adjusting position; and Figures 5 and 6 are views similar to Figure 3 and show the adjusting mechanism in its various positions.

Figure 1:
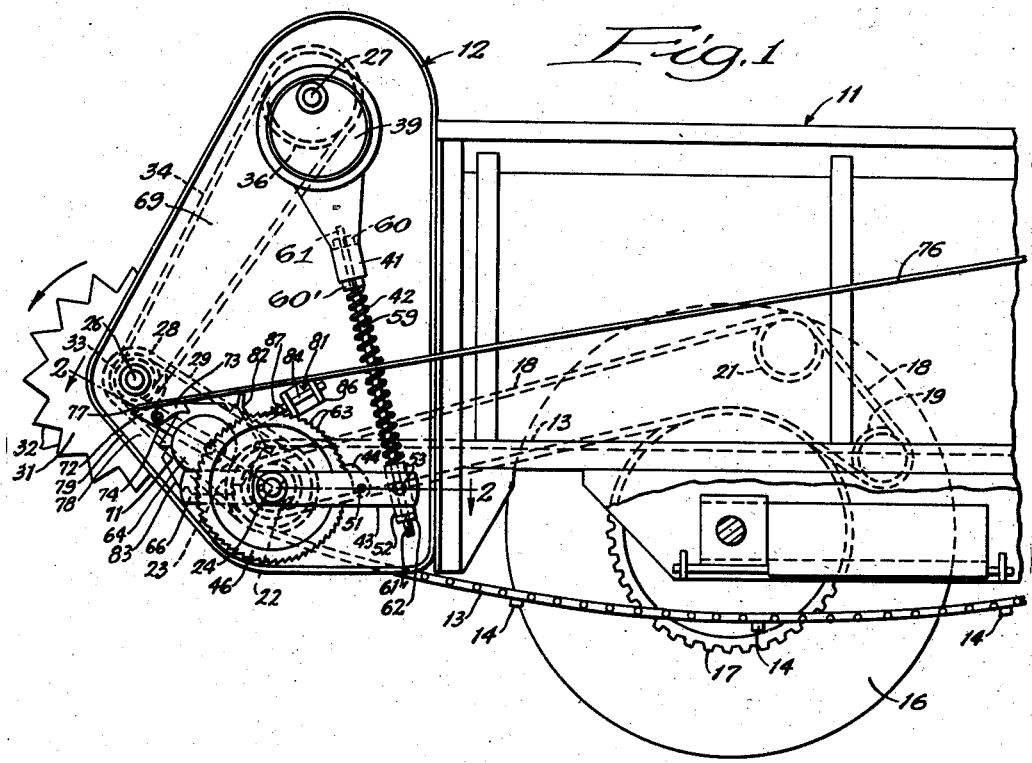
Figure 1 is a side elevational view of the manure spreader incorporating the variable speed mechanism of the present invention.

As shown in the drawings, reference numeral 11 indicates generally a manure spreader wagon or cart having a spreader unit mounted on the rear end thereof so that manure fed to the spreader from the wagon portion will be distributed substantially evenly over the field in which the vehicle is running. The present manure spreader is preferably drawn by some draft vehicle, such as a tractor, but of course may be pulled by any means or driven under its own power. The manure in the wagon 11 is carried to the spreader unit 12 by means of a conveyor consisting of a pair of chains 13 positioned at the extreme sides of the wagon and having cross slats 14 which act to move the manure in a rearward direction toward the spreader unit when the chains 13 are moved in a counter-clockwise direction, as viewed in Figure 1 of the drawings.

The driving means for the spreader unit elements and the conveyor chains 13 in the present embodiment is taken from a ground wheel 16, as shown in Figure 1, wherein a sprocket 17 is affixed to the wheel 16, and as it passes over the ground, the sprocket 17 is given rotation. The wheel 16 and sprocket 17 are on the far side of the manure spreader 11, and of course it will be understood that the corresponding wheel on the near side of the vehicle is removed so that operating mechanisms can be better seen. A chain 18 is adapted to be held in engaged position with the sprocket 17 by means of idler sprockets 19 and 21. The other end of the chain 18 surrounds a sprocket 22 also on the far side of the machine and shown only by dotted lines. This sprocket 22 and a sprocket 23 adjacent thereto are journaled on a shaft 24. The sprockets 22 and 23, however, are keyed to each other so that rotation of one imparts rotation to the other. Shafts 26 and 27 are mounted transversely in the spreader unit 12 parallel to the shaft 24. A sprocket 28 is keyed to the shaft 26, and a chain 29 extending around the sprockets 23 and 28 gives rotation to the shaft 26. A wide spreading auger 31 is keyed to the shaft 26 and, upon rotation thereof, is adapted to distribute manure over a comparatively large area. This auger 31 has a saw-tooth edge 32, which contributes to the breaking and separating of the manure preliminary to distribution. A second sprocket 33 is keyed to the shaft 26, and, by reason of a chain 34 and a sprocket 36 keyed to the shaft 27, rotation is given to the shaft 27 indirectly from the ground wheel 16. A beater or agitator, not shown, is keyed to the shaft 27 and is instrumental in aiding in the breaking up and separating of the manure along with the saw-tooth auger 31.

Figure 2:
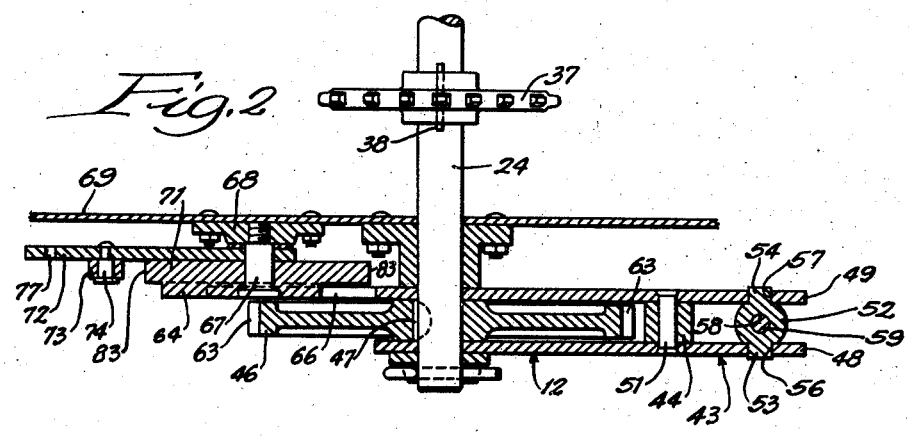
Figure 2 is a sectional view taken on the line 2—2 of Figure 1.

Sprockets 37, as shown in Figure 2, are affixed to the shaft 24 by means of a key 38. The chains 13 are wrapped around the sprockets 37, and, upon rotation of the shaft 24, it will be evident that the chain 13 and its cross slats 14 will likewise be moved.

A crank or eccentric member 39 is mounted on the outer end of the shaft 27 and is keyed thereto. A crank arm 41, including a spring 42, joints the crank or eccentric 39 and an arm 43 journaled for rotation on the shaft 24. A pawl 44 is pivoted on the arm 43 and is adapted to engage a ratchet wheel 46, which is keyed to the shaft 24 by means of a key 47, as best shown in Figure 2. The arm 43 consists of a pair of plate members 48 and 49, both journaled on the shaft 24. The pawl 44 is shown in Figure 2 and is pivoted about a short shaft 51 connecting the plates 48 and 49. The connection between the crank arm 41 and the arm 43 is best shown in Figure 2, wherein the plates 48 and 49 are interconnected by means of a member 52 having diametrically opposed projections 53 and 54 entering apertures 56 and 57 in the plates 48 and 49, respectively, and this forms a pivotal hinge for the member 52. The member 52 is equipped with a central bore 58 within which slides a rodlike extension 59 of the crank arm 41. As best shown in Figure 1, this rod-like extension 59 has its effective length adjustable by means of a pair of lock nuts 60 and 60' and nut 62 engaging threaded ends 61 and 61' respectively. The rod 59 freely passes through the bore aperture 58 in the member 52, but it is obvious that the nut 62 would prevent upward movement of the rod 59 without simultaneous upward movement of the member 52 and thus the arms 48 and 49 at that time when the nut 62 engages the bottom of the member 52. Adjustment of the length of the rod 59 controls movement of plates 48 and 49. It is obviously not necessary to employ an adjustment at both ends of the rod, as shown at 61 and 61', but rather one of these ends may be equipped with a fixed head. As the crank 39 rotates about the shaft 27, the arm 41 and integral rod 59 will cause a lifting and a lowering of the arm 43 about the shaft 24 and thus cause the pawl 44 to rotate the ratchet wheel 46 on the upward stroke. Of course, on the downward stroke the pawl slips backwardly over ratchet tooth 63 and thus will not rotate the ratchet wheel 46 clockwise, as viewing the device in Figure 1, but will only impart counter-clockwise rotation.

It will be evident that if the length of the crank arm 41 can be varied, a greater or lesser number of ratchet teeth 63 will be engaged by the pawl 44. To accomplish this varying of the crank arm effective length, a cam 64 is adapted to engage a rearward extension 66 of the plate 49, as best shown in Figures 1 and 2. The cam 64 is journaled on a short shaft 67 supported in a bracket 68 in side walls 69 of the spreader unit 12. The cam 64 is of such shape that in various positions it will provide various distances between the central shaft 67 and the rearward extension 66 of the plate 49. Such variable distances will cause the arm 43 to be inclined with respect to the horizontal position shown in Figure 1. For instance, as shown in Figure 5, the distance from the shaft 67 down to the arm extension 66 is much greater than that shown in Figure 1, and as a result thereof, the arm 43 has been pivoted about the shaft 24 and the ends of the plates 48 and 49 have been moved upwardly and have compressed the spring 42. The rod-like extension 59 projects beneath the member 52, leaving a comparatively wide space between the bottom of the member 52 and the nut 62. Now when the crank 39 rotates in a clockwise direction, the crank arm 41 and the rodlike extension 59 will be lifted as before, but, during such lifting movement, the arm 43 will not be affected until such time as the nut 62 contacts the bottom of the member 52. This lost-motion period limits the movement of the arm 43 in upward direction to its very minimum, and as shown in Figures 5 and 6, the movement of the ratchet wheel 46 is quite limited and, in fact, may be adjusted so as not to effect any movement of the ratchet wheel 46. Of course, there are many intermediate positions on the cam member 64 which will permit an advance of any number of ratchet teeth.

Movement of the cam 64 is accomplished by an integral ratchet wheel 71, which is likewise journaled on the shaft 67, as shown in Figure 2, and by means of a lever arm 72 and a pawl 73 pivoted on the arm at 74, the ratchet wheel 71 is rotated. A rope or cable 76 is attached to the end of the arm 72 at 77 and terminates at some point near the operator of the draft vehicle so that successive pulling movements of the rope 76 will cause the arm 72 to be moved in a clockwise direction as shown in Figure 1, thereby causing rotation of the ratchet wheel 71 by reason of the pawl 73. A spring 78 is anchored on a flange 79 of the side wall 69 of the spreader unit 12 and at its other end is attached to the arm 72, thus tending to normally maintain the arm 72 in a position as shown in Figure 1.

To effect a change in the position of the cam 64, the rope 76 is pulled forwardly, and the pawl 73 turns the ratchet wheel 71 and cam 64 concurrently, and as best shown in Figure 4, the extension 66 of the arm 43 is being depressed by such rotation of the cam 64. The ratchet wheel 71 is equipped with a plurality of flat surfaces 83 around the periphery thereof and, as shown is in the form of a hexagon, but this also may be varied to suit the particular need. A brake member 81 having a flat shoe portion 82 is adapted to contact flat surfaces 83 of the ratchet wheel 71. The surfaces 82 and 83 need not be flat, but may be any contour as long as they cooperate to resist rotation of the ratchet wheel 71. The shoe 82 is mounted on a slidable shaft 84 journaled within a bracket 86 on the side wall 69 of the spreader unit 12. A spring 87 is positioned intermediate the shoe 82 and the bracket 86 and surrounds the rod member 84, thus constantly exerting a pressure on the ratchet wheel 71. The contacting of the flat shoe 82 against the flat surfaces 83 of the ratchet wheel 71 tends to hold the ratchet wheel in a position wherein these flat surfaces engage. In other words, it would be impossible to maintain the cam 64 in its position, as shown in Figure 4, wherein the shoe 82 is contacting an apex 88 formed by two flat portions 83.

Figure 3 shows the cam fixed in the position shown in Figure 1 with the crank 39 in its uppermost position. During such movement of the arm 43, the ratchet wheel 46 has advanced its maximum number of teeth. Figures 5 and 6, as previously described, show the cam 64 in its position of holding the arm 43 in its greatest inclined position and thus limiting movement of the ratchet wheel 46 upon rotation of the crank 39 to its minimum movement. Figure 5 shows the crank 39 in its down position and Figure 6 shows the crank in its uppermost position whereupon it has just advanced the ratchet wheel 46 a minimum distance whether that be none, one, or any number of teeth. The number of fixed positions of the ratchet wheel 71, as determined by its flat surfaces, will fix the number of positions of the cam 64. With the ratchet wheel 71 hexagonal as shown, it has six flat surfaces and thus six corresponding positions at which the cam 64 may be fixed. Each position of the cam may bring about a different degree of movement of the ratchet teeth 63 or no movement at all depending on the particular shape and size of cam.

As the ratchet wheel 46 rotates so do the sprockets 37 inasmuch as both are keyed to the shaft 24. The sprockets 37 impart movement to the conveyor chains 13 and their integral cross slats 14. If it is desired to spread the manure in a greater quantity, the cam 64 is positioned as in Figure 1, wherein the ratchet wheel 46 has its maximum movement upon a single rotation of the crank 39. In order to effect a reduction in the quantity of manure to be spread, the rope 76 is pulled forwardly and then the rope 76 is released and the spring 78 will cause the arm 72 to be taken back to its position, as shown in Figure 1. A backward movement of the arm 72 will, of course, not affect the position of the ratchet wheel 71 and its integral cam 64 inasmuch as the pawl 73 slips over the ratchet wheel teeth. The rope 76 is again pulled forwardly, and such successive pulling and releasing is continued until the cam member 64 is positioned so that it will effect an advancing of the lesser number of ratchet teeth on the ratchet wheel 46 and thereupon spread a lesser quantity of manure.

Numerous details of construction may be varied throughout a wide range without departing from the principles disclosed herein, and it is, therefore, the intention to be limited only by the scope of the appended claims.

What is claimed is:

1. In a ratchet feed adjustment comprising, a ratchet wheel keyed to a shaft, an arm journally pivotable on said shaft, a pawl pivoted on said arm and adapted to engage said ratchet wheel, a reciprocable driving link having means associated with said arm, means for varying the effective length of the reciprocable driving link with respect to swinging said arm, said means for carrying the effective length comprising a cam adapted to contact a rearward extension of said arm and cause variable inclination of said arm upon rotation of said cam, and a second ratchet wheel integral with and adjacent said cam, a pawl adapted to engage and rotate said second ratchet wheel, whereby rotation of said second ratchet rotates said cam.

2. In a ratchet feed adjustment comprising, a ratchet wheel keyed to a shaft, an arm journally pivotable on said shaft, a pawl pivoted on said arm and adapted to engage said ratchet wheel, a reciprocable driving link having means associated with said arm, means for varying the effective length of the reciprocable driving link with respect to swinging said arm, said means for varying the effective length comprising a cam adapted to contact a rearward extension of said arm and cause variable inclination of said arm upon rotation of said cam, a second ratchet wheel integral with and adjacent said cam, a pawl engaging said second ratchet wheel, whereby rotation of said second ratchet rotates said cam, and means for remotely causing said pawl to rotate said second ratchet wheel.

3. In a ratchet feed adjustment comprising, a ratchet wheel keyed to a shaft, an arm journally pivotable on said shaft, a pawl pivoted on said arm and adapted to engage said ratchet wheel, a reciprocable driving link having means associated with said arm, means for varying the effective length of the reciprocable driving link with respect to swinging said arm, said means for varying the effective length comprising a cam adapted to contact a rearward extension of said arm and cause variable inclination of said arm upon rotation of said cam, a second ratchet wheel integral with and adjacent said cam, whereby rotation of said second ratchet rotates said cam, and means for retarding rotation of said second ratchet.

4. In ratchet feed adjustment comprising, a ratchet wheel keyed to a shaft, an arm journally pivotable on said shaft, a pawl pivoted on said arm and adapted to engage said ratchet wheel, a reciprocable driving link having means associated with said arm, means for varying the effective length of the reciprocable driving link with respect to swinging said arm, said means for varying the effective length comprising a cam adapted to contact a rearward extension of said arm and cause variable inclination of said arm upon rotation of said arm, a second ratchet wheel integral with and adjacent said cam, whereby rotation of said second ratchet rotates said cam, means for rotating said second ratchet, and means for retarding rotation of said second ratchet.

5. In a ratchet feed adjustment comprising, a ratchet wheel keyed to a shaft, an arm journally pivotable on said shaft, a pawl pivoted on said arm and adapted to engage said ratchet wheel, a reciprocable driving link having means associated with said arm, means for varying the effective length of the reciprocable driving link with respect to swinging said arm, said means for varying the effective length comprising a cam adapted to contact an extension of said arm and cause variable inclination of said arm upon rotation of said arm, a second ratchet wheel integral with and adjacent said cam, whereby rotation of said second ratchet rotates said cam, means for rotating said second ratchet, means for retarding rotation of said second ratchet, said means for rotating said second ratchet comprising a manually pivotable lever, and a pawl on said lever.

6. In a ratchet feed adjustment comprising, a ratchet wheel keyed to a shaft, an arm journally pivotable on said shaft, a pawl pivoted on said arm and adapted to engage said ratchet wheel, a reciprocable driving link having means associated with said arm, means for varying the effective length of the reciprocable driving link with respect to swinging said arm, said means for varying the effective length comprising a cam adapted to contact an extension of said arm and cause variable inclination of said arm upon rotation of said arm, a second ratchet wheel integral with and adjacent said cam, whereby rotation of said second ratchet rotates said cam, means for rotating said second ratchet, means for retarding rotation of said second ratchet, said means for rotating said second ratchet comprising a manually pivotable lever, a pawl on said lever, and resilient means for returning said lever to its original position after it has been manually pivoted to rotate the second ratchet and cam, whereby successive pivoting operations of the lever will cause a continuous rotation of the cam in one direction.

7. In a ratchet feed adjustment comprising, a ratchet wheel keyed to a shaft, an arm journally pivotable on said shaft, a pawl pivoted on said arm and adapted to engage said ratchet wheel, a reciprocable driving link having means associated with said arm, means for varying the effective length of the reciprocable driving link with respect to swinging said arm, said means for varying the effective length comprising a cam adapted to contact an extension of said arm and cause variable inclination of said arm upon rotation of said cam, a second ratchet wheel integral with and adjacent said cam, whereby rotation of said second ratchet rotates said cam, and means for retarding rotation of said second ratchet, said means for retarding comprising a resiliently yieldable brake shoe disposed to contact the surface of said second ratchet wheel.

8. In a ratchet feed adjustment comprising, a ratchet wheel keyed to a shaft, an arm journally pivotable on said shaft, a pawl pivoted on said arm and adapted to engage said ratchet wheel, a reciprocable driving link having means associated with said arm, means for varying the effective length of the reciprocable driving link with respect to swinging said arm, said means for varying the effective length comprising a cam adapted to contact an extension of said arm and cause variable inclination of said arm upon rotation of said cam, a second ratchet wheel integral with and adjacent said cam, whereby rotation of said second ratchet rotates said cam, and means for retarding rotation of said second ratchet, said means for retarding comprising a resiliently yieldable brake shoe disposed to contact the surface of said second ratchet wheel, and said second ratchet wheel having a plurality of separate surfaces, whereby said yieldable brake shoe is adapted to engage one of these separate surfaces and tends to maintain said second ratchet wheel non-rotatable.

9. In a ratchet feed adjustment comprising, a ratchet wheel keyed to a shaft, an arm journally pivotable on said shaft, a pawl pivoted on said arm and adapted to engage said ratchet wheel, a reciprocable driving link having means associated with said arm, means for varying the effective length of the reciprocable driving link with respect to swinging said arm, said means for varying the effective length comprising a cam adapted to contact an extension of said arm and cause variable inclination of said arm upon rotation of said arm, a second ratchet wheel integral with and adjacent said cam, whereby rotation of said second ratchet rotates said cam, means for rotating said second ratchet, means for retarding rotation of said second ratchet, said means for rotating said second ratchet comprising a manually pivotable lever, a pawl on said lever, and a spring for returning said lever to its original position after it has been manually pivoted to rotate the second ratchet and cam, whereby successive pivoting operations of the lever will cause a continuous rotation of the cam in one direction, said means for retarding comprising a resiliently yieldable brake shoe disposed to contact the surface of said second ratchet wheel.

10. In a ratchet feed adjustment comprising, a ratchet wheel keyed to a shaft, an arm journally pivotable on said shaft, a pawl pivoted on said arm and adapted to engage said ratchet wheel, a reciprocable driving link having means associated with said arm, means for varying the effective length of the reciprocable driving link with respect to swinging said arm, said means for varying the effective length comprising a cam adapted to contact an extension of said arm and cause variable inclination of said arm upon rotation of said arm, a second ratchet wheel integral with and adjacent said cam, whereby rotation of said second ratchet rotates said cam, means for rotating said second ratchet, means for retarding rotation of said second ratchet, said means for rotating said second ratchet comprising a manually pivotable lever, a pawl on said lever, and a spring for returning said lever to its original position after it has been manually pivoted to rotate the second ratchet and cam, whereby successive pivoting operations of the lever will cause a continuous rotation of the cam in one direction, said means for retarding comprising a resiliently yieldable brake shoe disposed to contact the surface of said second ratchet wheel, and said second ratchet wheel having a plurality of separate surfaces, whereby said yieldable brake shoe is adapted to engage one of these separate surfaces and tend to maintain said second ratchet wheel non-rotatable.

WILLIAM F. SCHMIED.